United States Patent [19]

Ploog

[11] Patent Number: 5,720,987
[45] Date of Patent: Feb. 24, 1998

[54] EXTRUSION DIE WITH CHANGEABLE FACE PLATE

[75] Inventor: Timothy H. Ploog, Chisago City, Minn.

[73] Assignee: The Pillsbury Company, Minneapolis, Minn.

[21] Appl. No.: 677,245

[22] Filed: Jul. 9, 1996

Related U.S. Application Data

[63] Continuation of Ser. No. 492,475, Jun. 22, 1995, abandoned, which is a continuation of Ser. No. 270,346, Jul. 5, 1994, which is a division of Ser. No. 993,311, Dec. 18, 1992, abandoned.

[51] Int. Cl.⁶ .................................................. B29C 47/06
[52] U.S. Cl. ............................. 425/131.1; 425/133.1; 425/190
[58] Field of Search ........................... 425/130, 131.1, 425/133.1, 573, 168, 190

[56] References Cited

U.S. PATENT DOCUMENTS

| | | | |
|---|---|---|---|
| 3,184,792 | 5/1965 | Commisso | 18/14 |
| 3,541,946 | 11/1970 | Johnston | 99/238 |
| 3,779,676 | 12/1973 | Bernard | 425/131.1 |
| 4,167,381 | 9/1979 | Hilmoe | 425/182 |
| 4,249,875 | 2/1981 | Hart et al. | 425/133 |
| 4,336,012 | 6/1982 | Koch | 425/131 |
| 4,405,547 | 9/1983 | Koch et al. | 425/131.1 |
| 4,499,041 | 2/1985 | Hahn et al. | 425/131.1 |
| 4,657,718 | 4/1987 | Sicka et al. | 425/131.1 |
| 4,698,000 | 10/1987 | Thulin et al. | 425/133 |
| 4,787,836 | 11/1988 | Osuna-Diaz et al. | 425/190 |
| 4,794,009 | 12/1988 | Dreisin | 426/283 |
| 4,835,000 | 5/1989 | Kehoe | 426/516 |
| 4,900,572 | 2/1990 | Repholz et al. | 425/131.1 |
| 5,022,252 | 6/1991 | Wellman et al. | 425/190 |
| 5,128,084 | 7/1992 | Tompkins et al. | 425/133.1 |

FOREIGN PATENT DOCUMENTS

363369  1/1981  Germany.

*Primary Examiner*—Tim Heitbrink
*Attorney, Agent, or Firm*—Janal M. Kalis; Aleya Rahman

[57] ABSTRACT

An extrusion die assembly for forming a food product having an elongated shell made of an extrudate includes a die housing and a nozzle disposed within the extruder housing such that a passageway is defined between the die housing and the nozzle for passing the extrudate. A removable die plate having a die opening is positioned across an outlet of the die housing such that an annulus is formed between the nozzle and the die plate for passing the extrudate to form the elongated shell.

19 Claims, 4 Drawing Sheets

EXTRUSION DIE WITH CHANGEABLE FACE PLATE

This is a continuation of prior application Ser. No. 08/492,475, filed Jun. 22, 1995, now abandoned, which is a continuation of application Ser. No. 08/270,346 filed on Jul. 5, 1994, which is a Divisional of application Ser. No. 07/993,311, filed Dec. 18, 1992, now abandoned.

BACKGROUND OF THE INVENTION

The present invention relates generally to an extrusion die assembly for producing extruded feed products, and more particularly, to an extruder head of a die assembly having a changeable face plate and which is capable of extruding an edible shelled product or co-extruding an edible center-filled product.

Extruders are widely used in a number of industries, especially the food industry. Extruders are utilized to produce a variety of products such as snack foods, breakfast cereals, pet foods, texturized vegetable proteins, and confections. Typical extruders consist of one or more sets of flighted screws which rotate within a barrel.

In devices which use extruders, an edible material such as dough is introduced into the extruder and is then forced into an extruder head inlet. The extruder head or die assembly includes a nozzle surrounded by an extruder head housing which forms an annular passageway around the nozzle. An edible material such as dough entering the annular passageway is forced through an extrusion area or annulus created between the extruder head housing and the nozzle at an extruder head outlet. When the extruder head is used for co-extrusion, a filling material is passed through a passageway formed in the nozzle simultaneously with another edible material such as dough passing through the extrusion area. Examples of devices used for extrusion or co-extrusion are illustrated in U.S. Pat. Nos. 4,835,000; 4,786,243; 4,651,894; 4,259,051 and 4,794,009. U.S. Pat. No. 4,715,803 shows a similar device used as a triple co-extruder.

Extruder heads currently used in the production of extruded foods give rise to a number of problems when used with edible materials such as dough. For example, since many edible materials, such as dough often contain abrasives, such as starches and since many edible materials such as dough are extruded at high pressures, the annulus between the extruder head housing and the nozzle wears quickly and becomes larger. The wearing of the annulus increases the wall thickness of the dough shell and results in a product that exceeds operating specification. When the outer edge of the annulus deteriorates beyond the point of useability, the entire extruder head housing must be repaired or replaced. Repairing the extruder head housing requires removing the outer extruder head housing, welding over the extruder head outlet, re-machining a new outlet, and finally reassembling the extruder head housing. Replacing the extruder head housing usually occurs if the outer edge of the annulus is beyond repair and such replacement is very expensive. Another problem with current extruder heads is that changing thickness of edible material such as dough often requires changing the entire extruder head which requires substantial time and cost.

U.S. Pat. No. 5,110,276 shows a die assembly used for co-extrusion having a removable die plate having orifices. Each die orifice has die insert members through which dough is extruded. However, the annulus is not formed between the removable die plate and the nozzle. Similarly, U.S. Pat. No. 4,900,572 shows a removable die plate secured to a housing, however the annulus is not formed between the removable die plate and the nozzle.

SUMMARY OF THE INVENTION

The present invention relates to a die assembly for extruding an elongated food product. The die assembly includes an inner core member or nozzle, and a die housing. The nozzle is disposed within the die housing such that an annular passageway is defined between the nozzle and die housing. The die assembly also includes a removable face plate positioned across an exit end of the die housing. The face plate has a bore through which the nozzle extends defining an annulus between the nozzle and the face plate for passing the extrudate.

In another embodiment, the die assembly is used for co-extruding a center-filled product. The nozzle includes a central passageway through which second extrudates, the center filling extrudate, core passes. A shell is formed by the extrudate exiting the annulus, and the shell enrobes the center filling extrudates to form a shelled product.

DETAILED DESCRIPTION OF THE PREFERRED EMBODIMENTS

Figure 1:
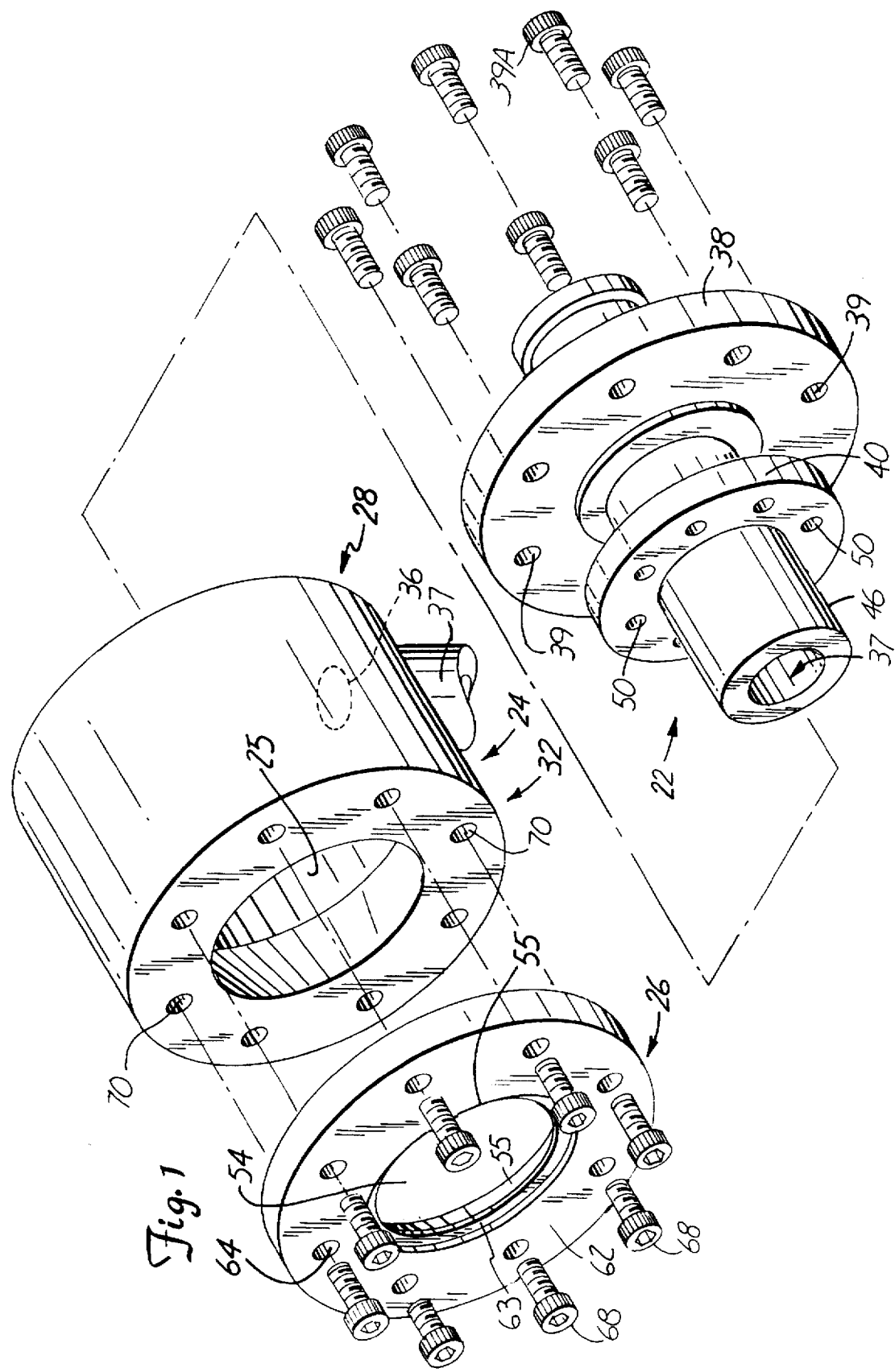
FIG. 1 is an exploded perspective view of the extrusion die assembly of the present invention.
Figure 2:
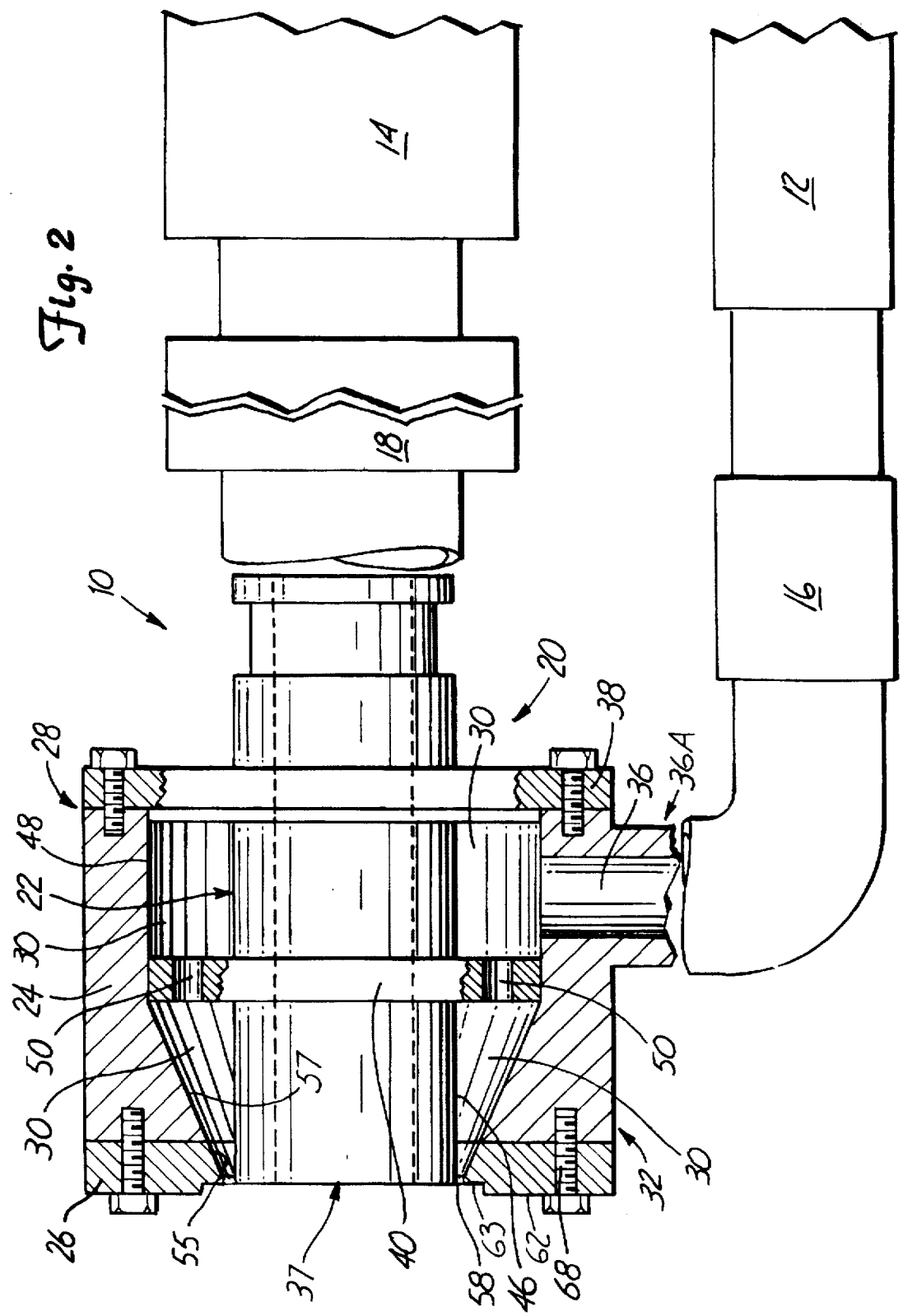
FIG. 2 is a cross sectional view of the extrusion die assembly of the present invention.

An extruder die assembly or extruder head, generally indicated by reference character 10 in FIGS. 1 and 2 includes a nozzle 22, a die housing 24, and a removable die plate or face plate 26.

The extruder die 10 operates in a wide number of industries on a wide range of extrudates; however, the extruder die 10 is particularly useful in the food industry where a first extrudate, suck as a dough, and a second extrudate, such as a filling are combined to produce an edible, center-filled food product. Containers 12 and 14 supply first and second extrudate (not shown), respectively to the extruder die 10 and can take any suitable form.

Extrusion or pumping device 16 connects container 12 to the nozzle 22 for supplying the dough. Extrusion or pumping device 18 connects container 14 to the die housing 24 for supplying the filling. Extrusion or pumping devices 16 and 18 can be of the same or different types and optionally selected from among a variety of feed mechanisms available in the art. In one example, one or both of the extrusion or pumping devices 16 and 18 includes an enclosed, automatically driven rotary valve or auger. In another example, one or both of the extruders 16 and 18 includes a device for supplying variable pressures to the extrudates and containers 12 and 14, combined with automatically actuated valves for regulating the flow of those materials under pressure to the extruder die 10.

The die housing 24 is of a generally tubular construction having a central bore 25. The die housing 24 opens at a back end 28 for insertion of the nozzle 22 into the die housing 24 such that an annular passageway 30 is formed around the nozzle 22, between the nozzle 22 and an inner wall 48 of the die housing 24. The die housing 24 opens at an exit end 32 for attachment of the removable face plate 26 and exiting of the food product. The die housing 24 has a bore or inlet 36 therethrough opening into the passageway 30. The bore 36 has a neck 36A for coupling the extruder die 10 to the extruder 16.

The nozzle 22 includes a central bore 37 through which the second extrudate such as filling of the food product passes. A flange 38 extending outwardly from an exterior surface 46 of the nozzle 22 forms an end wall of the extruder die 10 when the nozzle 22 is positioned in he die housing 24. The flange 38 has a plurality of coupling holes 39 equally spaced around the nozzle 22 for receiving screws 39A for removably coupling the nozzle 22 to the die housing 24. A distribution flange 40 extends outward from the exterior surface 46 of the nozzle 22 to the inner wall 48 of the die housing 24 for supporting and centering the nozzle 22 within the die housing 24. The distribution flange 40 is positioned on the nozzle 22 such that it is between the bore 36 and the exit end 32 when inserted within the die housing 24. The distribution flange 40 has a plurality of distribution holes 50 equally spaced around the nozzle 22 through which the first extrudate such as dough is forced.

Figure 3:
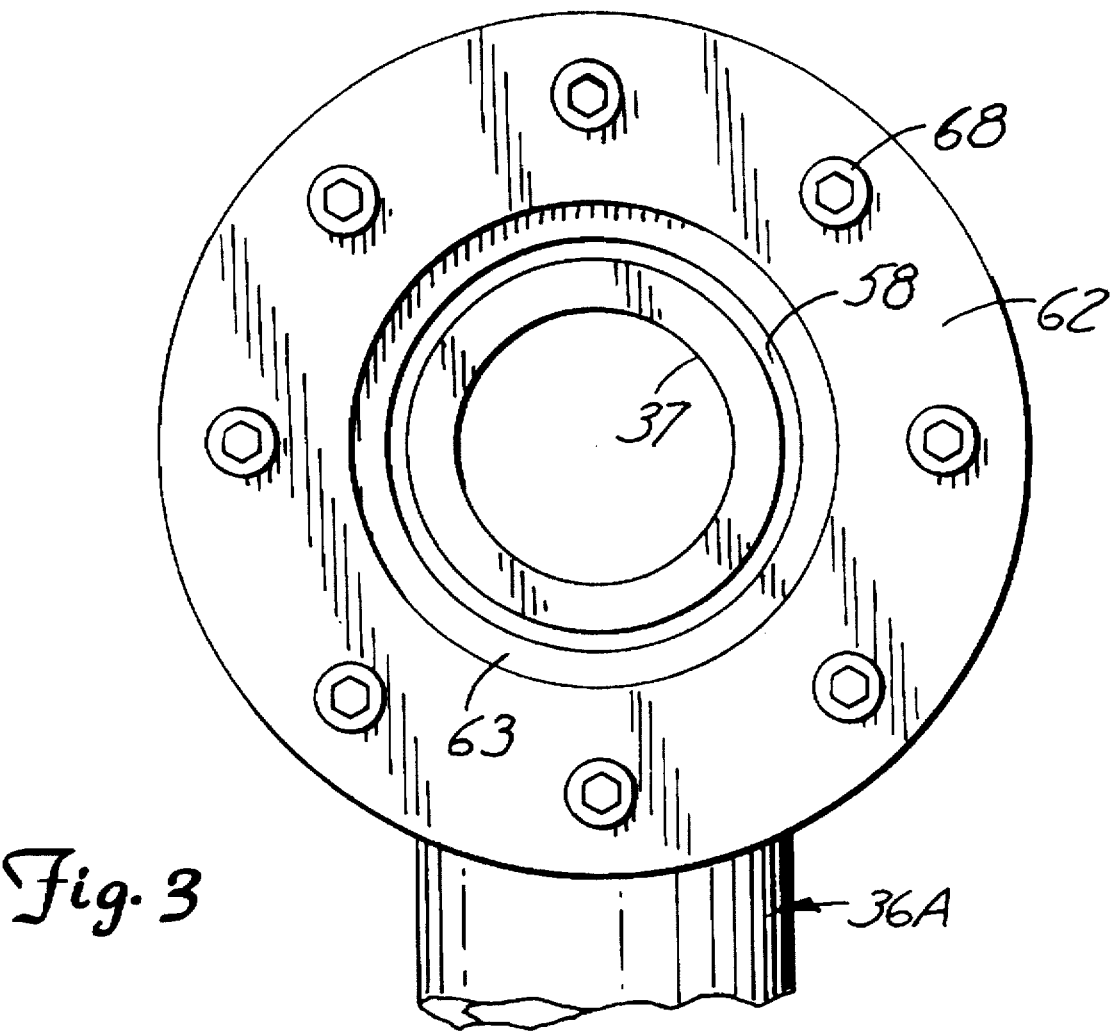
FIG. 3 is a front elevational view of the extrusion die assembly.

Referring to FIGS. 1-3, the removable face plate 26 is positioned across and is removably attached to the exit end 32 of the die housing 24. The removable face plate 26 includes a bore or annular die opening 54 forming an inner edge 55. The annular opening 54 extends around the nozzle 22 when the face plate 26 is positioned on the extruder die 10. An annulus 58 is formed between the exterior surface 46 of the nozzle 22 and the inner edge 55 of the face plate 26 for passing the first extrudate such as dough and forming the shell of the extruded product. The annulus 58 is commonly referred to as the dough extrusion area wherein the outer edge of the dough extrusion area is the inner edge 55 of the face plate 26 and the inner edge of the dough extrusion area is the outer edge 46 of the nozzle 22. The dough extrusion area is typically between 0.05 inches and 0.25 inches in width.

In order to avoid wearing of the inner wall 48 of the die housing 24, the diameter of the inner edge 55 of the face plate 26 should be at most equal to the diameter of the passageway 30 at the exit end 32 of the die housing 24. Preferably, the diameter of the annular opening 54 is less than the diameter of the passageway 30 at the exit end 32 of the die housing 24 such that dough exiting the extruder die 10 wears the face plate 26 and not the die housing 24.

The face plate opening 54 tapers outward towards the die housing 24 in alignment with a tapered wall 57 in the passageway 30 at the exit end 32 of the die housing 24. The inner edge 55 of the face plate 26 is substantially parallel to the nozzle 22 at the dough extrusion area 58. The face plate 26 has an outer surface 62 and preferably a countersunk annular shoulder surface 63 that is preferably substantially flush with the outer surface of the nozzle 22.

Figure 4:
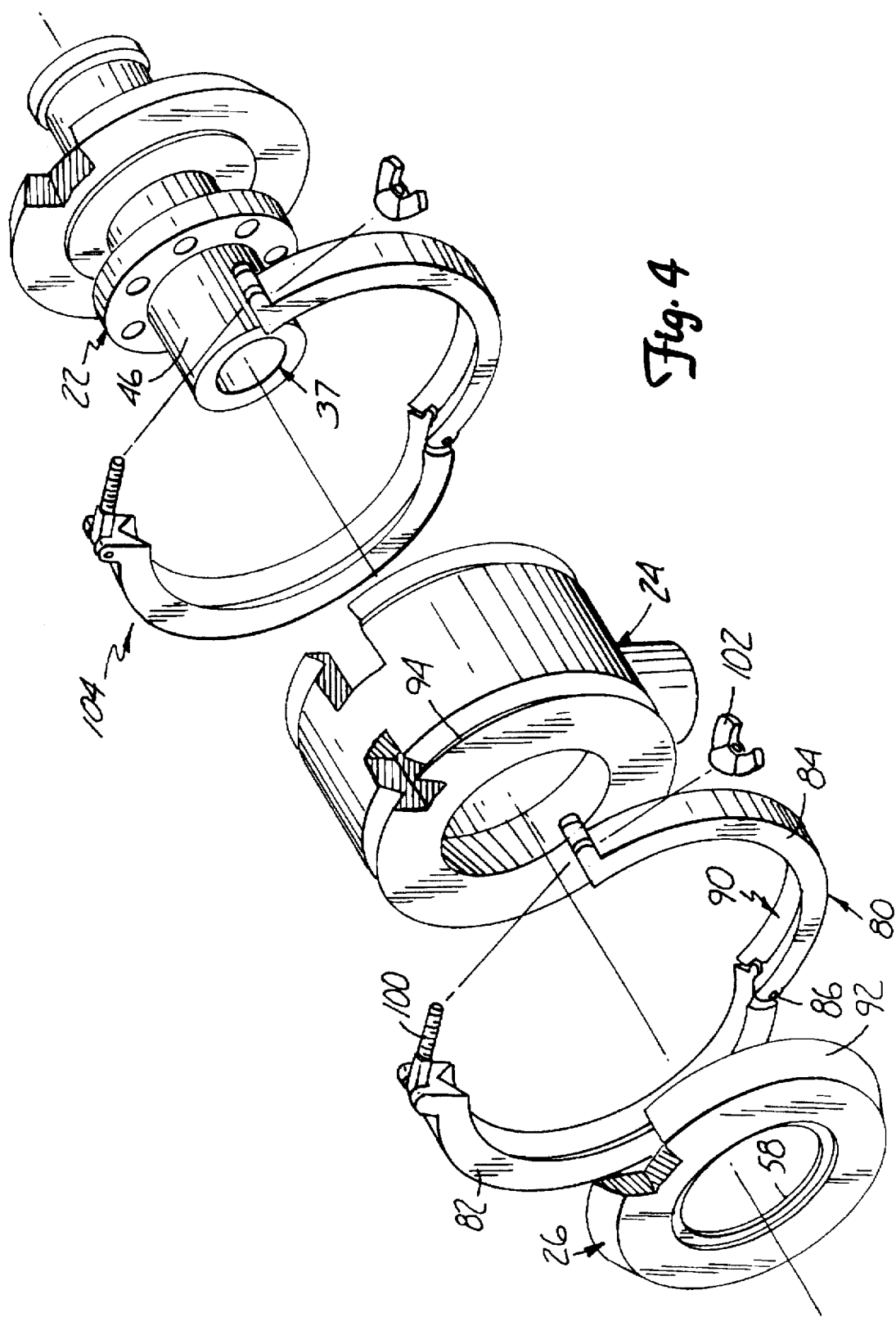
FIG. 4 is an exploded perspective view of another embodiment of the extrusion die assembly of the present invention.

The face plate 26 includes a plurality of coupling holes 64 equally spaced around the annular opening 54 for receiving screws 68 for removably coupling the face plate 26 to threaded holes 70 on the die housing 24. In another embodiment, as shown in FIG. 4, a split collar clamping member 80 clamps the face plate 26 to the die housing 24. The clamping member 80 includes a first arcuate member 82, a second arcuate member 84, a hinge 86 fixedly connecting the first and second arcuate members together, and a latch 88. The first and second arcuate members 82 and 84, respectively, have a "V-shaped" groove 90 which clamps to a corresponding inverted "V-shaped" section formed by tapered surface 92 on the face plate 26 and tapered groove surface 94 on the die housing 24. The latch 88 includes a screw 100 pivotally connected to the first arcuate member 82, and a nut 102 which secures the screw 100 and first arcuate member 82 to the second arcuate member 84 thereby securing the face plate 26 to the die housing 24. In this embodiment, an identical split clamping member 104 clamps the nozzle 22 to the die housing 24 as shown in FIG. 4.

Referring to in FIGS. 1-3, the removable face plate 26 provides the outer edge of the dough extrusion area instead of the die housing 24, so that the entire extruder die 10 does not have to be replaced when the outer edge of the dough extrusion area wears. In fact, only the face plate 26 has to be replaced at minimal costs. In addition, when a new product requires a change in dough thickness, only the face plate 26 has to be changed and hoe the entire extruder die 10. The face plate change saves both time and money during the extrusion process.

The nozzle 22, extruder housing 24 and face plate 26 are constructed of stainless steel and are capable of withstanding extrusion pressures exceeding 2,000 pounds per square inch. The present extruder die 10 can be constructed by retro-fitting an existing extruder head such as on a DeFrancisci Machine Corp., Model-Lab-2, Serial No. 5770-78 extruder. Retro-fitting an extruder head requires removing by milling, cutting or other means the front end of the die housing 24 such that a portion of the exterior surface 46 of the nozzle 22 is exposed. The removable face plate 26 is attached to the die housing 24 such that the nozzle 22 is positioned within the annular opening 54 and such that the annulus 58 is defined between the nozzle 22 and the die housing 24.

In operation, flour and other required fluids are fed into the containers 12 and 14 and mixed. The resulting dough enters extrusion or pumping devices 16 and 18 and is forced into the extruder die 10 under pressure. The filling (second extrudate) is fed into the back end 28 of the extruder die 10 at preferably a maximum of 50 pounds per square inch while the dough (first extrudate) is forced through the bore 36 of the die housing 24 preferably at between approximately 400 to 2,000 pounds per square inch. The filling enters the bore 37 of the nozzle 22 while the dough enters the passageway 30 formed between the exterior surface 46 of the nozzle 22 and the interior surface 48 of the die housing 24. The dough is forced from the back end 28 of the extruder head 20 through the holes 50 in the distribution flange 40 towards the extrusion area 58. The width of the extrusion area 58 is determined by the distance between the exterior surface 46 of the inner core member 22 and the inner edge 55 of the face plate 26. The dough enrobes the filling upon exit from the extruder die 10. If the extruder head 10 is used to make a shell-like product without the center filling, the extruder 18 is simply not operated or the bore 37 is plugged.

As abrasives within the dough wear the inner edge 55 of the face plate 26 or if it is desirable to change the width of the annulus 58 to change the dough thickness, the face plate 26 can be removed by removing the screws 68 holding the face plate 26 to the die housing 24, and retightening the screws 68 with another face plate. Thus, a removable face plate for an extruder die 10 saves both time and money since the entire die housing 24 does not have to be replaced.

Although the present invention has been described with reference to preferred embodiments, workers skilled in the art will recognize that changes may be made in form and detail without departing from the spirit and scope of the invention.

What is claimed is:

1. A method for directing wear of a die assembly to substantially one component of the assembly used to form a food product having an elongated shell made of a first edible material having abrasives therein, the method comprising:

providing an extruder die assembly having an inner core member;

providing a die housing having a wall forming a cavity, the inner core member being disposed within the cavity and defining a passageway having a diameter between the inner core member and the wall, the die housing having a first inlet for receiving the first edible material into the passageway and an outlet through which the inner core member is extended; and providing a first removable face plate, which is separately removably attachable to the die housing across the outlet, and which includes an inner wall defining a die opening having a diameter less than the diameter of the passageway defined by the inner core member extending around the inner core member such that an annulus is formed between an exterior surface of the inner core member and the inner wall of the removable face plate wherein the face plate wears preferentially as compared to the die housing;

removably attaching the first removable face plate across the outlet of the die housing; forcing the first edible material under pressure through the first inlet, the passageway, and the annulus to form the elongated shell of the food product; and replacing the first removable face plate with another removable face plate when the abrasives within the first edible material having worn away the inner wall of the first removable face plate instead of the die housing such that the size of the annulus is maintained substantially constant.

2. The method of claim 1, wherein the inner core member includes an inner passageway for passing a second edible material therethrough, and wherein the method further comprises forcing the second edible material through the inner passageway of the inner core member as the first edible material passes through the annulus such that the first edible material enrobes the second edible material.

3. The method of claim 1, wherein the die housing has a second inlet for receiving the inner core member into the cavity, the second inlet being positioned along an axis of the die housing.

4. The method of claim 1, wherein the inner core member includes a flange operable with a portion of the die housing wall forming the passageway for retaining the inner core member within the cavity.

5. The method of claim 1, wherein the removable face plate has a plurality of coupling holes equally spaced around the cavity for receiving screw means for removably coupling the removable face plate to the die housing.

6. The method of claim 1, wherein the removable face plate is attached to the die assembly with clamping means.

7. The method of claim 1 wherein the inner core member has an annular distribution flange extending outwardly from the exterior surface of the inner core member to the die housing for supporting and centering the inner core member within the die housing and the face plate cavity, the distribution flange having a plurality of distribution holes spaced around the inner core member through which the first edible material is forced.

8. The method of claim 6, wherein the clamping means is a plurality of threaded screws which pass through bores in the removable face plate to engage corresponding threaded openings in the die housing.

9. The method of claim 6, wherein the clamping means is a split-collar clamp having a V-shaped groove.

10. A method for forming a food product having an elongated shell made of a first edible material having abrasives therein and directing the abrasives to substantially one component of the extruder die assembly, the method comprising:

providing an extruder die assembly having an inner core member;

providing a die housing having a wall forming a cavity, the inner core member being disposed within the cavity and defining a passageway between the inner core member and the wall, the die housing having a first inlet for receiving the first edible material into the passageway and an outlet through which the inner core member is extended; and providing a first removable face plate, which is separately removably attachable to the die housing across the outlet, and which includes an inner wall forming a die opening extending around the inner core member such that the annulus is formed between the inner core member and the inner wall of the removable face plate having a different width than the annulus formed using another removable face plate wherein the face plate wears preferentially to the die housing;

forcing the first edible material under pressure through the first inlet, the passageway, and the annulus to form the elongated shell of the food product;

removably attaching the first face plate across the outlet of the die housing; and replacing the first removable face plate with another removable face plate when the abrasives within the first edible material have worn away the inner wall of the face plate instead of the die housing.

11. A method for directing wear of a die assembly, the die assembly including a face plate, the wear directed onto the face plate, when the die assembly is used to form a food product having an elongated shell made of a first edible material having abrasives therein, the method comprising:

providing an extruder die assembly having an inner core member;

providing a die housing having a wall forming a cavity, the inner core member being disposed within the cavity and defining a passageway having a diameter between the inner core member and the wall, the die housing having a first inlet for receiving the first edible material into the passageway and an outlet through which the inner core member is extended; and providing a first removable face plate, which is separately removably attachable to the die housing across the outlet, and which includes an inner wall defining a die opening having a diameter less than the diameter of the passageway defined by the inner core member extending around the inner core member such that an annulus is formed between an exterior surface of the inner member and the inner wall of the removable face plate wherein the face plate wears preferentially as compared to the die housing;

removably attaching the first removable face plate across the outlet of the die housing;

forcing the first edible material under pressure through the first inlet, the passageway, and the annulus to form the elongated shell of the food product; and replacing the first removable face plate with another removable face plate when the abrasives within the first edible material have worn away the inner wall of the face plate instead of the die housing.

12. The method of claim 11, wherein the die housing has a second inlet for receiving the inner core member into the cavity, the second inlet being positioned along an axis of the die housing.

13. The method of claim 11, wherein the inner core member includes a flange operable with a portion of the die housing wall forming the first inlet for retaining the inner core member within the cavity.

14. The method of claim 11 wherein the die opening appears outward toward the die housing.

15. The method of claim 11 wherein the face plate has a plurality of coupling holes equally spaced around the cavity for receiving screw means for removably coupling the die plate to the housing.

16. The method of claim 11 wherein the face plate is attached to the die assembly with clamping means.

17. The method of claim 11, wherein the inner core member has an annular distribution flange extending outward from the exterior surface of the inner core member to the housing for supporting and centering the inner core member within the housing and the face plate cavity the distribution flange having a plurality of distribution holes spaced around the inner core member through which the first edible material is forced.

18. The method of claim 11 wherein the clamping means is a plurality of threaded screws which pass through bores in the removable face plate to engage corresponding threaded openings in the housing.

19. The method of claim 16 wherein the clamping means is a split-collar clamp having a V-shaped groove.

* * * * *

UNITED STATES PATENT AND TRADEMARK OFFICE
CERTIFICATE OF CORRECTION

PATENT NO. : 5,720,987
DATED : February 24, 1998
INVENTOR(S) : Timothy H. Ploog

It is certified that error appears in the above-indentified patent and that said Letters Patent is hereby corrected as shown below:

Col. 3, line 11, delete the word "he" and insert the word --the--.

Col. 4, line 18, delete the word "hoe" and insert the word --not--.

Signed and Sealed this

Second Day of June, 1998

Attest:

BRUCE LEHMAN

Attesting Officer

Commissioner of Patents and Trademarks